United States Patent [19]

Tsuji et al.

[11] Patent Number: 4,921,652

[45] Date of Patent: May 1, 1990

[54] PROCESS FOR PRODUCING A POROUS FILM

[75] Inventors: Syoichi Tsuji; Syoichi Ito; Shuji Matsumura; Hisatosi Suzuki, all of Aichi; Michiyasu Ito, Mie, all of Japan

[73] Assignee: Mitsui Toatsu Chemicals, Inc., Tokyo, Japan

[21] Appl. No.: 229,797

[22] Filed: Aug. 8, 1988

Related U.S. Application Data

[63] Continuation of Ser. No. 945,706, Dec. 23, 1986, abandoned.

[30] Foreign Application Priority Data

Dec. 23, 1985 [JP] Japan ................................. 60-287909

[51] Int. Cl.$^5$ ........................ B29C 67/20; B29C 55/04
[52] U.S. Cl. ............................... 264/41; 264/DIG. 47
[58] Field of Search ................ 264/DIG. 47, 41, 145, 264/154

[56] References Cited

U.S. PATENT DOCUMENTS

| | | | |
|---|---|---|---|
| 3,903,234 | 9/1975 | Ikeda et al. | 264/DIG. 47 |
| 3,929,950 | 12/1975 | Nakamura et al. | 264/289.6 |
| 4,187,210 | 2/1980 | Howard, Jr. | 264/294 |
| 4,350,655 | 9/1982 | Hoge | 264/210.1 |
| 4,704,238 | 11/1987 | Okuyama et al. | 264/41 |

FOREIGN PATENT DOCUMENTS

| | | |
|---|---|---|
| 0066672 | 3/1982 | European Pat. Off. . |
| 2505251 | 5/1982 | France . |
| 2027637 | 8/1978 | United Kingdom . |
| 2151538 | 12/1984 | United Kingdom . |

*Primary Examiner*—James Lowe
*Attorney, Agent, or Firm*—Sughrue, Mion, Zinn, Macpeak & Seas

[57] ABSTRACT

A process for producing a porous film having practically sufficient mechanical strengths, good flexibility, uniform fine pores and high moisture vapor permeability, and further an extremely thin porous film, which process comprises blending 30 to 80 parts by weight of an inorganic fine powder having a specific surface area of 15 m$^2$/g or less and an average particle size of 0.4 to 4 $\mu$m with 20 to 70 parts by weight of a polyolefin resin, followed by melt-molding the resulting blend into a film and then stretching the film to 2 to 7 times the original length at least in the uniaxial direction.

2 Claims, No Drawings

PROCESS FOR PRODUCING A POROUS FILM

This is a continuation of application Ser. No. 06/945,706 filed 12/23/86, now abandoned.

BACKGROUND OF THE INVENTION

1. Field of the Invention

This invention relates to a process for producing a porous film having flexibility and a structure of uniform fine pores and hence superior water vapor permeability and water resistance and useful for waterproof clothings, waterproof covers, packaging materials, etc.

2. Description of the Related Art

There has so far been known a process for producing a porous film by blending non-compatible substances such as inorganic fine powders with a polyolefin resin in a specified proportion, followed by melt-molding the resulting blend into a film or sheet and then uniaxially or biaxially stretching the film or sheet.

However, such a process has had a drawback that since the resin is stretched and oriented by stretch processing, the film or sheet increases in the hardness so that its flexibility is damaged.

In order to overcome such a problem, the following processes for producing a porous film have been proposed:

(1) a process of blending a thermoplastic elastomer with a polyolefin resin and a filler (Japanese patent application laid-open No. Sho 59-30833/1984);

(2) a process of blending a liquid or waxy hydrocarbon polymer with a polyolefin resin and a filler (U.S. Pat. No. 4,472,328); and (3) a process of blending barium sulfate as an inorganic fine powder with a polyolefin resin (G.B. No. 2,151,538).

However, porous films obtained according to these production processes have the following practical drawbacks:

According to the process (1), the resulting porosity is insufficient and the water vapor permeability is inferior. According to the process (2), the resulting porous film has a problem that in the high temperature atmosphere or after a long time lapse, hydrocarbon polymers bleed out on the surface of the resulting film so that the surface is sticky. According to the process (3), the resulting porous film has a good flexibility and sufficient water vapor permeability, but the stretching stability i.e. the high stretchability is inferior. Further, as a problem in common to these processes, it is impossible to produce an extremely thin film of about 20μ. Furthermore, another process of blending a third component brings about a large increase in cost.

SUMMARY OF THE INVENTION

The object of the present invention is to provide a process for producing a porous film which comprises a polyolefin resin having a superior solvent resistance, and has practically sufficient mechanical strengths and a good flexibility and also has uniform fine pores and high moisture vapor permeability, and further an extremely thin porous film.

The present invention resides in a process for producing a porous film which comprises blending 30 to 80 parts by weight of an inorganic fine powder having a specific surface area of 15 $m^2/g$ or less and an average particle size of 0.4 to 4 μm with 20 to 70 parts by weight of a polyolefin resin, these parts by weight being based on 100 parts by weight of the blend, followed by melt-molding the resulting blend into a film and then stretching the film to 2 to 7 times the original length at least in the uniaxial direction.

DETAILED DESCRIPTION OF THE PREFERRED EMBODIMENTS

Examples of the polyolefin resin used in the present invention are polypropylene, low density polyethylene, linear low density polyethylene, high density polyethylene and mixtures thereof. Among these, linear low density polyethylene and blends containing linear low density polyethylene are particularly preferred. Examples of the comonomer component for linear low density polyethylene are generally butene, 4-methylpentene, hexene, octene, decene, etc. and among these, 4-methylpentene and octene are preferred in the aspect of moldability and physical properties of products.

The inorganic fine powder used in the present invention is fine particles having a specific surface area of 15 $m^2/g$ or less and an average particle size of 0.4 to 4 μm. Examples of the inorganic fine powder used in the present invention are calcium carbonate, magnesium carbonate, magnesium oxide, barium sulfate, silica, aluminum hydroxide, alumina, etc. Among these, precipitated calcium carbonate and precipitated barium sulfate are preferred since such materials have a uniform particle diameter and specific surface area and when they are blended with the resin component and the resulting blend is molded, they have superior dispersibility and the blend has superior processability. Further, the inorganic fine powder is preferred to have a spherical shape. Precipitated barium sulfate is usually obtained for example by the reaction of barium sulfide with an aqueous solution of sodium sulfate or the reaction of barium sulfide with sulfuric acid. The shape includes amorphous shape, spindle shape, plate shape, diamond shape, spherical shape, etc. When the concentrations of barium sulfide and $SO_4^{2-}$, the mechanical conditions of the reaction and the reaction temperature are set under specified conditions, precipitated barium sulfate having a desired average particle size is obtained.

Further, the precipitated calcium carbonate is usually formed by introducing carbon dioxide into an aqueous suspension of calcium hydroxide. It has a cubic shape having an average particle size of 1μ or less or a spindle shape or an acicular shape having an average particle size of 1μ or more. When the reaction temperature of the aqueous suspension of calcium hydroxide, addition of a particular salt and the termination time of the reaction are set under specified conditions, a spherical precipitated calcium carbonate having a desired average particle size is obtained.

The specific surface area of the inorganic fine powder is 15 $m^2/g$ or less and a range of 0.5 to 5 $m^2/g$ is preferred. If the specific surface area exceeds 15 $m^2/g$, the shape of the inorganic fine powder becomes amorphous shape, plate shape or acicular shape so that the particle size distribution becomes broad and the stretchability of film becomes lowered; hence no good porosity is obtained. Further, the porosity of the surface of the fine powder increases and due to the volatile components such as moisture attached to the pores, foaming is observed at the time of melt-molding the pore size of the resulting film is increased and its water-resistant is remarkably reduced.

The average particle size of the inorganic fine powder is preferably in the range of 0.4 to 4 μm, more preferably in the range of 0.6 to 2 μm. If the average particle size exceeds 4 μm, the stretchability of the film is inferior and stretching breakage occurs prior to uniform stretching. Thus, the production stability is inferior to make uniform pore-formation impossible.

On the other hand, if the average particle size is less than 0.4 μm, the mineral fine powder cannot be highly filled to be unable to make the resulting film porous.

In the resin composition of the present invention, the quantity of the inorganic fine powder is in the range of 30 to 80 parts by weight, preferably 30 to 70 parts by weight based on 100 parts by weight of the blend. With the quantity of less than 30 parts by weight, no good porosity can be obtained in respect of the stretched film. If the quantity exceeds 80 parts by weight, kneadability, dispersibility and stretchability are inferior; thus naturally the water vapor permeability is also inferior and the flexibility lowers.

Next, the process for producing the porous film of the present invention will be described. First, an inorganic fine powder is mixed with a polyolefin resin in specified proportions. The mixing process has no particular limitation. In general, the materials are mixed by means of a blender or the like, followed by blending the mixture by means of a Banbury mixer or another melt-kneader in advance, thereafter pelletizing the blend or not pelletizing it and then sheeting by means of a conventional sheet-molding machine. It is possible to optionally add various additives such as lubricant e.g. calcium stearate, pigment, stabilizers such as those against heat, light and others, plasticizers, antistatic agent, etc.

The film is generally made by calendering, casting or extrusion, but among these, extrusion using a circular die or a T-die is preferred. The extruded sheet is then at least in the uniaxial direction stretched in a stretching ratio of 2 to 7 times at the softening temperature or lower of the polyolefin resin according to a known process. Among the above range of the stretching ratio, 4 to 6 times are preferred. If the stretching ratio is less than 2 times, it is difficult to obtain a good water vapour permeability, while if it exceeds 7 times, stretching breakage occurs to make stabilized production impossible.

The present invention will be described in more detail by way of Examples. Physical properties of the film were evaluated according to the following methods:

Specific surface area (m²/g): measured according to BET adsorption method.

Average particle size (μm): measured by means of an instrument for measuring the powder surface area (manufactured by Shimazu Seisakusyo), by filling its sample (3 g) in a sample cylinder of 2 cm² × 1 cm and measuring the time of air permeation (5 cc) under 50 mm water pressure.

Tensile strength at break (kg): according to JIS P-8113 using samples of 25 mm wide × 100 mm long; grip separation rate 200 mm/min., the tensile strength at break was measured MD (machine direction) and in TD (traverse direction to MD), respectively.

Water vapor permeability: measured according to ASTM-E-96-66.

Softness: Evaluation was made by hand touch as follows:
A: very soft
B: somewhat soft
C: considerably hard

EXAMPLES 1~9

Inorganic fine powders [precipitated barium sulfate (Examples 1~4 and 8~9), precipitated calcium carbonate (Examples 5 and 6) or magnesium oxide (Example 7)] having a specific surface area and an average particle size indicated in Table 1 were added to a linear low density polyethylene of MI=2 (L-LDPE (Examples 1~7)), a low density polyethylene of MI=5 (LDPE (Example 8)) or a polypropylene of MI=1.5 (PP (Example 9)) in quantities indicated in Table 1, followed by blending the mixture by means of Henschel mixer (tradename), pelletizing the blend, making the pellets into a film by extrusion, and then uniaxially roll-stretching the film to 2 to 7 times the original length at 50° C. to obtain a porous film of 20 μm thick. The physical properties of the film were then measured. The results are shown in Table 1.

EXAMPLE 10

A film made from the same composition as in Example 2 was stretched (3×3) times in the longitudinal direction simultaneously with the traverse direction at 70° C. by means of a biaxially stretching machine to obtain a porous film of 20 μm thick. The evaluation results of its physical properties are shown in Table 1.

EXAMPLE 11

Twenty % by weight of a linear low polyethylene (L-LDPE) of MI=2, 20% by weight of a low density polyethylene (LDPE) of MI=5 and 60% by weight of precipitated barium sulfate having a specific surface area of 4.1 m²/g and an average particle size of 0.8 μm were blended to obtain a porous film in the same manner as in Example 1. The evaluation results of its physical properties are shown in Table 1.

COMPARATIVE EXAMPLES 1~6

Porous films were prepared in the same manner as in Example 1 except that an inorganic fine powders [precipitated barium sulfate (Comparative Examples 1~3 and 5~6) or calcium carbonate (Comparative Example 4)] under varied kinds, filled quantities and stretching conditions as indicated in Table 1 was blended with a L-LDPE in varied quantities. The evaluation results of their physical properties are shown in Table 1. In Comparative Example 1, since the quantity of fine powders added is less than 30%, the porosity lowers and the water vapor permeability is small. In Comparative Example 2, since the quantity of fine powders added exceeds 80%, the stretchability lowers and stretching breakage occurs in a stretching ratio of 1.5 times. In Comparative Examples 3 and 4, since the specific surface area of the fine powder exceeds 15 m²/g, the stretchability lowered and foaming was observed at the time of extrusion by means of a sheet molding machine, and split. In Comparative Example 5, since the average particle size of fine powders exceeds 4 μm, the stretchability lowered so that it is impossible to effect a stabilized production in a stretching ratio of 2.0. In Comparative Example 6, since the stretching ratio is less than twice, no sufficient water vapor permeability can be obtained.

Since the film of the present invention is sufficiently porous, the water vapor permeability and air permeability are good and also the water resistance is superior. Particularly since its flexibility is good to afford a soft hand, it is suitable for clothings, particularly for sanitary use application. As compared with prior art, it is possible to produce even an extremely thin film of 20 μm thickness or less; thus the resulting porous film scarcely has use application where it is used as a single product, but its main use application is directed to its lamination onto non-woven fabric, pulp, nylon taffeta, etc. The thinner the film, the less the cost, and further, a specific feature is exhibited that at the time of clothing, the fitting feeling due to the thickness of the laminate is not uncomfortable.

μm and a spherical particle shape, selected from the group consisting of precipitated calcium carbonate, barium sulfate, precipitated barium sulfate, magnesium carbonate, magnesium oxide, silica, aluminum hydroxide and alumina with 20 to 70 parts by weight of a polyolefin resin, these parts by weight being based on 100 parts by weight of the blend, followed by melt-molding the resulting blend into a film and then stretching the film to 2 to 7 times the original length at least in the uniaxial direction.

TABLE 1

| | Basic resin | | Inorganic fine powders | | | | | Tensile strength at break (kg) | | Water vapor permeability | |
| | Kind | Amount added (wt %) | Kind | Specific surface area (m²/g) | Average particle size (μm) | Amount added (wt %) | Stretch ratio (times) | MD | TD | (g/m² 24 hrs) | Flexibility |
|---|---|---|---|---|---|---|---|---|---|---|---|
| Example | | | | | | | | | | | |
| 1 | L-LDPE | 30 | Precipitated BaSO₄ | 4.1 | 0.8 | 70 | 2 | 3.0 | 1.0 | 2000 | A |
| 2 | " | 40 | Precipitated BaSO₄ | " | " | 60 | 5 | 4.0 | 0.5 | 3500 | A |
| 3 | " | 65 | Precipitated BaSO₄ | " | " | 35 | 7 | 5.5 | 0.3 | 2500 | A |
| 4 | " | 50 | Precipitated BaSO₄ | 8.0 | 0.5 | 50 | 6 | 5.0 | 0.4 | 3200 | A |
| 5 | " | 40 | Precipitated CaCO₃ | 14.0 | 0.5 | 60 | 4 | 5.8 | 0.4 | 2200 | B |
| 6 | " | 60 | Precipitated CaCO₃ | 5.5 | 3.0 | 40 | 5 | 4.2 | 0.5 | 2300 | B |
| 7 | " | 50 | MgO | 7 | 1.1 | 50 | 5 | 4.3 | 0.4 | 2700 | B |
| 8 | LDPE | 40 | Precipitated BaSO₄ | 4.1 | 0.8 | 60 | 4 | 3.0 | 0.3 | 1800 | B |
| 9 | PP | 30 | Precipitated BaSO₄ | 4.1 | 0.8 | 70 | 6 | 6.0 | 0.3 | 3200 | B |
| 10 | L-LDPE | 40 | Precipitated BaSO₄ | 4.1 | 0.8 | 60 | 3 × 3 | 4.5 | 3.8 | 7000 | A |
| 11 | L-LDPE LDPE | 40 | Precipitated BaSO₄ | 4.1 | 0.8 | 60 | 6 | 4.5 | 0.3 | 3300 | A |
| Comparative ex. 1 | L-LDPE | 80 | Precipitated BaSO₄ | 4.1 | 0.8 | 20 | 8 | 6.5 | 0.1 | 500 | C |
| 2 | " | 10 | Precipitated BaSO₄ | 4.1 | 0.8 | 90 | | | | | |
| 3 | " | 50 | Precipitated BaSO₄ | 18.3 | 0.3 | 50 | | | | | |
| 4 | " | 70 | CaCO₃ | 16.5 | 1.0 | 30 | | | | | |
| 5 | " | 60 | Precipitated BaSO₄ | 0.8 | 4.5 | 40 | 2 | 2.8 | 0.8 | 1500 | B |
| 6 | " | 40 | Precipitated BaSO₄ | 4.1 | 0.8 | 60 | 1.5 | 2.5 | 1.5 | 100 | C |

What we claimed is:

1. A process for producing a porous film which consists essentially of blending 30 to 80 parts by weight of an inorganic fine powder having a specific surface area of 15 m²/g or less, an average particle size of 0.4 to 4 μm and a spherical particle shape, selected from the group consisting of precipitated calcium carbonate, barium sulfate, precipitated barium sulfate, magnesium carbonate, magnesium oxide, silica, aluminum hydroxide and alumina with 20 to 70 parts by weight of a polyolefin resin, these parts by weight being based on 100 parts by weight of the blend, followed by melt-molding the resulting blend into a film and then stretching the film to 2 to 7 times the original length at least in the uniaxial direction.

2. A process according to claim 1 wherein said polyolefin resin is a linear low density polyethylene resin or a blend containing the same.

* * * * *